Figure 1:
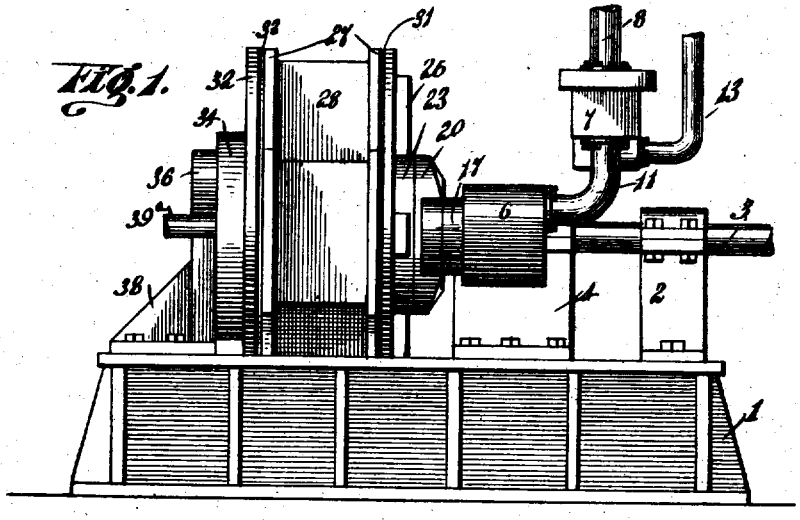

No. 12,631. REISSUED APR. 9, 1907.

J. L. STRICKLAND.

ROTARY ENGINE.

APPLICATION FILED MAR. 2, 1907.

3 SHEETS—SHEET 1.

WITNESSES

Wm. A. Wyman

R. B. Smart

INVENTOR

J. L. STRICKLAND

BY Frank Fehlendorf

ATT'Y.

THE SUDERS PRINTING CO., WASHINGTON, D. C.

No. 12,631.
REISSUED APR. 9, 1907.
J. L. STRICKLAND.
ROTARY ENGINE.
APPLICATION FILED MAR. 2, 1907.
3 SHEETS—SHEET 2.
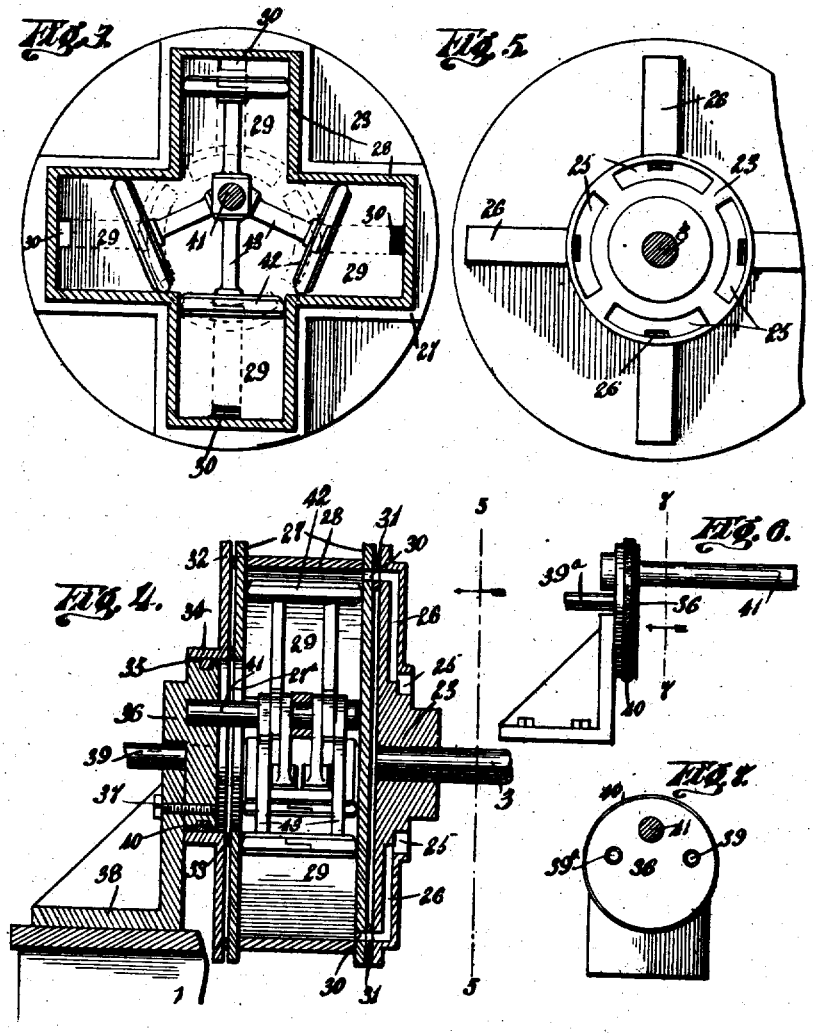
WITNESSES
Wm. A. Wyman.
R. E. Smart
INVENTOR
J. L. STRICKLAND
BY Fred J. Kelsenberg
ATT'Y.
THE NORRIS PETERS CO., WASHINGTON, D. C.

No. 12,631. REISSUED APR. 9, 1907.

J. L. STRICKLAND.

ROTARY ENGINE.

APPLICATION FILED MAR. 2, 1907.

3 SHEETS—SHEET 3.

WITNESSES

Wm. A. Wyman

R. E. Smart

INVENTOR

J. L. STRICKLAND

BY Frank B. Fehlendorf

ATT'Y.

THE NORRIS PETERS CO., WASHINGTON, D. C.

UNITED STATES PATENT OFFICE.

JAMES LOCKE STRICKLAND, OF WESTPORT, NOVA SCOTIA, CANADA, ASSIGNOR OF FIFTY-ONE ONE-HUNDREDTHS TO HARRY RICHARD McLELLAN, OF ST. JOHN, NEW BRUNSWICK, CANADA.

ROTARY ENGINE.

No. 12,631. Specification of Reissued Letters Patent. Reissued April 9, 1907.

Original No. 823,821, dated June 19, 1906. Application for reissue filed March 2, 1907. Serial No. 360,624.

*To all whom it may concern.*

Be it known that I, JAMES LOCKE STRICKLAND, a subject of the King of Great Britain, residing at Westport, county of Digby, in the Province of Nova Scotia, Canada, have invented certain new and useful Improvements in Rotary Engines; and I do hereby declare that the following is a full, clear, and exact description of the invention, such as will enable others skilled in the art to which it appertains to make and use the same.

My invention relates to rotary engines.

The object of my invention is to provide an engine of few movable parts in which the friction is reduced to a minimum; and my invention consists of the construction, combination, and arrangement of parts, as herein illustrated, described, and claimed.

In the accompanying drawings, forming part of this application, I have illustrated one form of embodiment of my invention, in which drawings similar reference characters designate corresponding parts, and in which—

Figure 2:
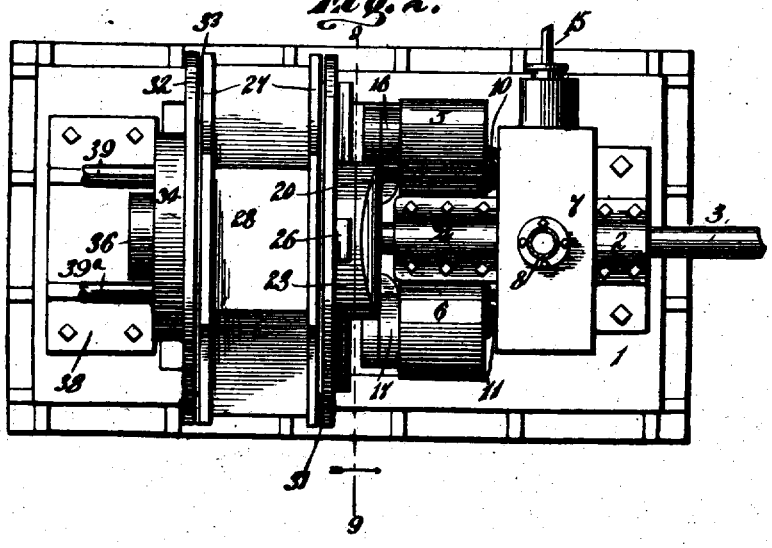
Figure 8:
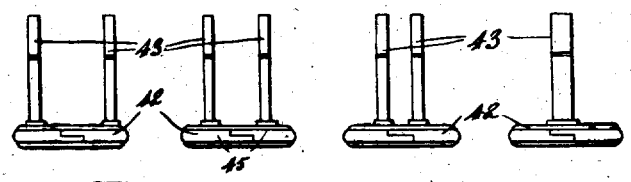
Figure 9:
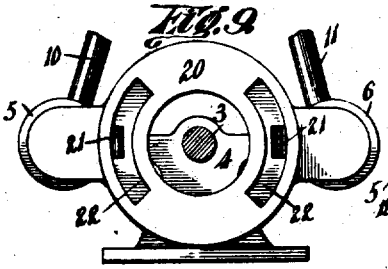
Figure 10:
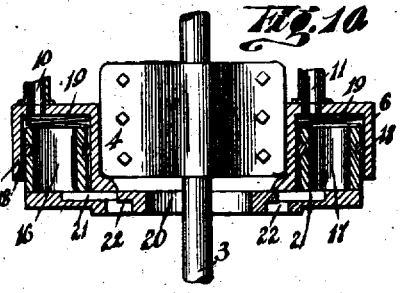
Figure 11:
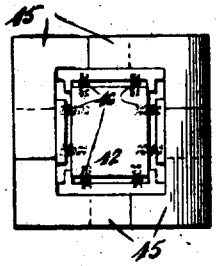
Figure 12:
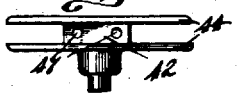
Figure 13:
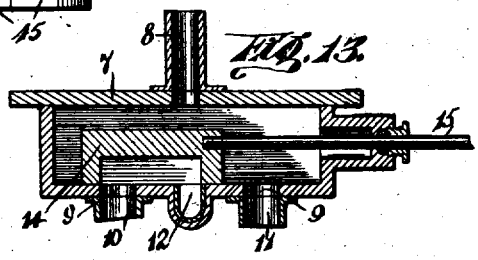

Figure 1 is a side elevation. Fig. 2 is a plan view. Fig. 3 is a vertical transverse section showing the interior construction of the cylinders and the arrangement of the pistons. Fig. 4 is a longitudinal vertical section through the cylinders, showing the pistons in elevation. Fig. 5 is a vertical section on line 5 5 of Fig. 4 looking in the direction indicated by the arrow. Fig. 6 is a fragmentary detail, in side elevation, showing the bearing for one side of the cylinders and the piston-shaft. Fig. 7 is a vertical section on line 7 7 of Fig. 6 looking in the direction indicated by the arrows. Fig. 8 is an elevation of the four pistons used in the engine. Fig. 9 is a vertical section taken on line 9 9 of Fig. 2 looking in the direction indicated by the arrow. Fig. 10 is a plan view of the main bearing of the engine, showing the arrangement of cylinders on each side thereof. Fig. 11 is a fragmentary detail, in front elevation, of one of the piston-heads. Fig. 12 is an edge elevation of one of the piston-heads, the packing being removed; and Fig. 13 is a vertical section through the steam-chest of the engine.

Referring to the drawings, 1 designates a bed-plate having on one end a bearing 2. Disposed in the bearing 2 is a main shaft 3, which is also supported by the main bearing 4, carried by the bed-plate 1. Disposed on the opposite sides of the main bearing 4 are cylinders 5 and 6, and disposed above the main bearing is a steam-chest 7, having a supply-pipe 8. The steam-chest is provided with a plurality of ports 9, to which are connected the pipes 10 and 11, the pipe 10 connecting with the cylinder 5 and the pipe 11 connecting with the cylinder 6. The steam-chest 7 is provided with an exhaust-port 12, to which is connected an exhaust-pipe 13. Disposed in the steam-chest is a slide-valve 14, adapted to cover one of the outlet-ports 9 and the exhaust-port 12 and has connected thereto a valve-rod 15 for the purpose of actuating the valve to the desired position.

Disposed in the cylinder 5 is a cylinder 16, and disposed in the cylinder 6 is a cylinder 17, suitable packing-rings 18 being disposed around each of the cylinders 16 and 17 to make a steam-tight connection. Disposed in each of the cylinders 5 and 6 are springs 19, adapted to thrust against the inner ends of the cylinders 16 and 17, so that a slight play is permitted. Connecting the cylinders 5 and 6 is a ring 20, having passages 21 communicating with the cylinders 16 and 17 and having elongated slots 22 communicating with the passages 21. Secured on the shaft 3 is a plate 23, provided with four slots 25, communicating with radially-disposed steam-passages 26. Secured to the plate 23 are a plurality of disks 27, connected by webs 28, provided with chambers 29, forming the cylinders of the engine. Adjacent the outer ends of the chamber 29 are openings 30, communicating with the passages 26, suitable packing 31 being placed round each opening intermediate of the disks 27′ and the plate 23. Disposed on the side of one of the disks 27 opposite to the plate 23 is a disk 32, suitable packing 33 being interposed between the disk 27 and the disk 32 to make a steam-tight fitting. The disk 32 is provided with a flange 34 and provided with an opening $27^a$ in the adjacent disk 27, in which opening 35 is disposed a bearing 36, secured by bolts 37 to a pedestal 38, which pedestal is disposed on the bed-plate 1. Disposed through the bearing 36 is a steam-pipe 39, connecting with the boiler and an exhaust-pipe $39^a$, and a suitable packing-ring 40 is disposed between the bearing 36 and the flange 34 of the outside disk 32.

Carried by the bearing 36 and projecting within the space between the disks 27 is a shaft 41. Disposed in each of the chambers 29 is a piston-head 42, and each piston-head has secured thereto a rod 43, the end of which is pivotally mounted on the shaft 41. The chambers 29 are preferably square in cross-section, and each of the piston-heads 42 comprises the plates 44, (see Figs. 11 and 12,) between which are disposed four movable sections 45, of packing, the packing being actuated outwardly against the sides of the chambers 29 by means of the helical springs 46, whose inner ends are disposed in openings 47 in the squared outer ends of the rods 43.

Rotation of the shaft 3 is produced by pressure of the steam against the sides of the chambers 29, the area of the chambers being different, owing to the disposition of the piston-heads 42, the shaft 41 being placed eccentric to the shaft 3.

Steam being admitted through the pipe 11, it passes into the cylinder 6, thence through one of the passages 21 and one of the slots 22 into one of the steam-passages 26, and thence into one of the chambers 29, causing rotation of the cylinders 29 and the consequent oscillation of the piston-heads 42, which are secured to the shaft 41. Steam is exhausted from the cylinder 29 through the passage 26, out of the slots 22 and into the cylinder 5, and from thence to the steam-chest. When one pair of the slots 25 register with the slots 22, steam is admitted to the chambers 29, and rotation of the cylinders in one direction is caused, so that if the slide-valve 14 is moved to cover the opposite port 9 the steam will be admitted through the pipe uncovered, and the movement of the cylinders 29 will be reversed. When steam is admitted through the cylinder 5 into the cylinders 29 through the passages described, it should be understood that the exhanust is through the corresponding passages on the exhaust side and into the cylinder 6, the slots 22 being two in number and being placed in the same horizontal plane, the passages 26 leading to the cylinders 29 being successively uncovered by rotation of the parts. The shaft 31 being placed eccentric to the shaft 3 and the disks 27 being revolved with the shaft 3, it is evident that the piston-heads 42 must be oscillated by this movement, thereby changing the area of the chambers on which the steam exerts power. The thrust of the steam against the plates 27 being toward the left hand of Fig. 1, steam from the boiler is admitted through the pipe 39 to counterbalance the thrust, and the pipe 39[a] permits the exhaust of this steam when the steam in the cylinders 29 is exhausted, the friction of the thrust being materially lessened by this relief.

Having thus fully described my invention, what I claim as new, and desire to secure by Letters Patent, is—

1. In a rotary engine, the combination comprising a bed-plate, a plurality of bearings on the bed-plate, a shaft disposed in the bearings, a plurality of cylinders secured on the shaft, a bearing for the cylinders, means for admitting steam to the cylinders, means for exhausting steam from the cylinders, oscillating pistons depressed in the cylinders, and means for overcoming the thrust of the shaft.

2. In a rotary engine, the combination comprising a bed-plate, a main bearing on the bed-plate, a pair of cylinders carried on the main bearing, means for admitting steam to the cylinders, a ring connecting the cylinders and provided with steam-passages terminating in slots, a ring secured on the shaft and provided with steam-passages adapted to register with the slots, a plurality of cylinders secured on the shaft in connection with the steam-passages, oscillating pistons disposed in the cylinders on the shaft, and means for overcoming the thrust of the shaft.

3. In a rotary engine, the combination comprising a bed-plate, a main bearing on the bed-plate, a pair of cylinders carried on the main bearing, means for admitting steam to the cylinders, a ring connecting the cylinders and provided with steam-passages terminating in a pair of slots arranged in the same horizontal plane, a ring secured on the shaft and provided with four steam-passages, two of which are adapted to register with the slots at the same time, a plurality of cylinders secured on the shaft and provided with ports communicating with the steam-passages, oscillating pistons disposed in the cylinders on the shaft, and means for overcoming the thrust of the shaft.

4. In a rotary engine, the combination comprising a bed-plate, a main bearing on the bed-plate, a pair of cylinders carried on the main bearing, means for admitting steam to the cylinders, a ring connecting the cylinders and provided with steam-passages terminating in slots, a ring secured on the shaft and provided with steam-passages adapted to register with the slots in the ring, a plurality of cylinders secured on the shaft in connection with said steam-passages, oscillating pistons disposed in the cylinders on the shaft each comprising a pair of plates, packing arranged in sections disposed between the plates, and means for actuating the packing outward, and means for overcoming the thrust of the shaft.

5. In a rotary engine, the combination comprising a shaft, a ring secured to the shaft and provided with steam-passages, a plurality of cylinders secured to the ring and provided with ports communicating with said steam-pistons, oscillating passages disposed in the cylinders each comprising a plurality of plates, packing arranged in sections between said plates, and springs disposed behind said packing and adapted to actuate the same outwardly, means for admitting steam to said passages, and means for balancing the thrust of the shaft.

6. In a rotary engine, the combination comprising a bed-plate, a plurality of bearings on one end of the bed-plate, a shaft rotatably disposed in the bearings, a disk on the shaft, a second disk provided with a web connected to the disk on the shaft, said web being formed with cylinders, means for admitting steam to the cylinders, oscillating pistons disposed in the cylinders, and means for balancing the thrust of the shaft.

7. In a rotary engine, the combination comprising a bed-plate, a plurality of bearings on one end of the bed-plate, a main shaft disposed in the bearings, a plurality of cylinders secured on the shaft, oscillating pistons disposed in the cylinders, means for admitting steam to the cylinders, a disk secured to the cylinders and provided with a flanged opening, a bearing disposed in the opening and secured to the bed-plate, and means for balancing the thrust of the shaft.

8. In a rotary engine, the combination comprising a bed-plate, a plurality of bearings on one end of the bed-plate, a main shaft disposed in the bearings, a plurality of cylinders secured on the shaft, oscillating pistons disposed in the cylinders, means for admitting steam to the cylinders, a disk secured to the cylinders and provided with a flanged opening, a bearing disposed in the opening and secured to the bed-plate, a shaft secured to the bearings, a plurality of rods pivotally mounted on the shaft and connected to the pistons, and means for balancing the thrust of the shaft.

9. In a rotary engine, the combination comprising a bed-plate, a plurality of bearings on one end of the bed-plate, a main shaft disposed in the bearings, a plurality of cylinders secured on the shaft, oscillating pistons disposed in the cylinders, means for admitting steam to the cylinders, a disk secured to the cylinders and provided with a flanged opening, a bearing disposed in the opening and secured to the bed-plate, a shaft secured to the bearings eccentric to the main shaft, a plurality of rods pivotally mounted on the shaft and connected to the pistons, and means for balancing the thrust of the shaft.

10. In a rotary engine, the combination comprising a bed-plate, a plurality of bearings on one end of the bed-plate, a main shaft disposed in the bearings, a plurality of cylinders secured on the shaft, oscillating pistons disposed in the cylinders, means for admitting steam to the cylinders, a disk secured to the cylinders and provided with a flanged opening, a bearing disposed in the opening and secured to the bed-pate, a shaft secured to the bearings, a plurality of rods pivotally mounted on the shaft and connected to the pistons, an inlet-pipe, and an exhaust-pipe disposed through said bearing.

11. In a rotary engine, the combination comprising a bed-plate, bearings on the bed-plate, a shaft disposed in the bearings, a plurality of cylinders carried by one of the bearings, a plurality of cylinders disposed in the first cylinders, packing-rings and springs interposed between said cylinders, means for admitting steam to the cylinders, a plurality of cylinders rotatable with the shaft, means for admitting steam to the rotatable cylinders, oscillating pistons disposed in the rotatable cylinders, and means for balancing the thrust of the shaft.

12. In a rotary engine, the combination comprising a shaft, a pair of cylinders disposed adjacent the shaft, a ring disposed around the shaft and provided with a pair of cylinders, disposed within the first cylinders, a disk secured on the shaft and provided with steam-passages, said ring being provided with steam-passages connecting with the disk and the cylinders, a plurality of cylinders secured on the shaft in connection with the steam-passages in the disk, passages in the cylinder, and means for balancing the thrust of the shaft.

13. A rotary engine, including in combination a rotating cylinder, having a closed end, a piston closing the opposite end of the cylinder, means for varying the angular relation of the piston and cylinder, and means for introducing an expansive fluid between them, as and for the purpose specified.

14. A rotary engine, including in combination, a rotating cylinder having a closed end, a piston inclosing the opposite end, means for varying the angular relation of the piston and cylinder, means for introducing and exhausting an expansive fluid, and means for controlling the introduction and exhaustion, as and for the purpose specified.

15. A rotary engine including in combination, a plurality of cylinders rotating about a fixed center, pistons therein having each of their parts rotating with constant radius about a fixed center, which is eccentric to that about which the cylinders rotate, and means for introducing an expansive fluid between the cylinders and pistons, as and for the purpose specified.

16. A rotary engine, including in combination, a plurality of cylinders rotating about a fixed center, pistons therein having each of their parts rotating with constant radius about a fixed center, which is eccentric to that about which the cylinders rotate, means for introducing and exhausting a motive fluid in the cylinders, and means for controlling the said introduction and exhaustion, as and for the purpose specified.

17. A rotary engine, including in combination, a cylinder rotating about a fixed center, a piston therein, a rod rigidly connected to the piston, a pivoting-pin extending through the extremity of the rod at a point eccentric to the center about which the cylinder rotates, and means for exerting an expansive force between the cylinder and pistons, as and for the purpose specified.

18. A rotary engine, including in combination, a rotating rectangular cylinder having a closed end, a rectangular piston closing the opposite end, means for varying the angular relation of the piston and cylinder, and means for exerting an expansive force between the cylinder and the piston, as and for the purpose specified.

19. A rotary engine, including in combination, a plurality of cylinders rotating about a fixed center, pistons therein having each of their parts rotating with constant radius about a fixed center, eccentric to that center about which the cylinders rotate, means for admitting and exhausting an expansive fluid at the end of the cylinders, and a valve mechanism controlling the said admission and exhaustion, as and for the purpose specified.

20. The combination, in a rotary engine, of a rotating cylinder, a piston therein, means for causing a combined reciprocating and rocking movement between the cylinder and piston, and means for introducing an expansive fluid between the cylinder and piston, as and for the purpose specified.

21. A rotary engine, including in combination, a plurality of symmetrically-arranged cylinders, rotating about a fixed center, a plurality of pistons operating therein, having each of their parts rotating with constant radius about a fixed center, eccentric to that about which the cylinders rotate, and means for introducing an expansive fluid between the cylinders and pistons, as and for the purpose specified.

22. A rotary engine, including in combination, a plurality of cylinders centrally united to form a common central open space, means for rotatably supporting the same, a plurality of pistons operating in the cylinders, piston-rods rigidly connected to the pistons, a pivoting-pin extending through each of the piston-rods about which the pistons and piston-rods rotate with constant radii, and means for introducing an expansive fluid between the pistons and cylinders, as and for the purpose specified.

23. A rotary engine, including in combination, a plurality of cylinders, rotating about a fixed center, a plurality of pistons therein, a plurality of rods rigidly connected to the pistons, each rod, except one, being bifurcated, and adapted to fit one over the other, a pivoting-pin extending through the extremities of all the piston-rods, and about which the pistons are adapted to rotate with constant radius, and means for introducing an expansive fluid between the pistons and cylinders, as and for the purpose specified.

24. A rotary engine including in combination a plurality of cylinders rotating about a fixed center, pistons therein having each of their parts rotating with constant radius about a fixed center, eccentric to that about which the cylinders rotate, movable packing in the pistons, means for actuating the same outwardly, and means for exerting an expansive force between the cylinders and pistons, as and for the purpose specified.

25. A rotary engine, including in combination, a plurality of cylinders, having ports in their outer ends, means for rotatably supporting the cylinders, a plate adjacent to one side of the cylinder, having radial fluid passage-ways therein, means for conducting an expansive fluid to and exhausting it from the said passage-ways, a plurality of pistons operating in the cylinders having each of their parts rotating with constant radius about a fixed center eccentric to that about which the cylinders rotate, as and for the purpose specified.

26. A rotary engine, including in combination, a plurality of cylinders, a shaft, a bearing supporting the same, connecting means extending between the cylinders and the shaft, a plurality of pistons operating in the cylinders, piston-rods rigidly connected to the same, a pivoting-pin extending through the piston-rods about which the piston-rods and pistons rotate with constant radii, said pin being placed eccentrically to the shaft to which the cylinders are secured, and means for introducing an expansive fluid between the pistons and cylinders.

27. A rotary engine, including in combination, two disks, a connecting-web extending between the same and forming a plurality of cylinders, a shaft connected to one disk, means for rotatably supporting the opposite disk, a bearing for the shaft, pistons operating in the cylinders, piston-rods rigidly connected thereto, a pivoting-pin extending through each of the piston-rods and located eccentrically to the shaft about which the piston and piston-rods are adapted to rotate with constant radii and means for introducing an expansive fluid between the pistons and cylinders, as and for the purpose specified.

28. A rotary engine, including in combination, two disks, a plurality of webs extending between the same and forming a plurality of cylinders, plates connected to the disks, a shaft connected to one plate, means for rotatably supporting the other plate, a plurality of radial steam passage-ways through one plate, a plurality of pistons operating in the cylinders, piston-rods rigidly connected to the same, a pivoting-pin extending through the piston-rods about which they rotate with constant radii, and means for supporting the pin in position eccentric to the shaft, and means for conducting an expansive fluid to and exhausting it from the passage-ways in the plate, as and for the purpose specified.

29. A rotary engine, including in combination, two disks, webs connecting the same and forming a plurality of cylinders, a shaft connected to one disk, a bearing for the opposite disk, a bearing for the shaft, a plurality of pistons operating in the cylinders, a plurality of piston-rods rigidly connected to the same, a pivoting-pin extending through the piston-rods, and means for rigidly supporting the pin in position eccentrically to the shaft, and means for introducing an expansive fluid between the pistons and cylinders.

30. A rotary engine, including in combination, two disks, a plurality of webs connecting the disks and forming a plurality of cylinders, two plates connected to the disks, a shaft connected to one plate, an annular flange formed integral with the opposite plate, a bearing contacting with the flange, a bearing for the shaft, a plurality of radial steam passage-ways in one disk, means for introducing steam to and exhausting it from said passage-ways, a plurality of pistons operating in the cylinders and plurality of piston-rods connected thereto, a pivoting-pin extending through the extremity of the piston-rods about which the same rotates with constant radii, and means for rigidly supporting the pin in a position eccentric to the shaft, as and for the purpose specified.

Signed at the city of St. John, in the Province of New Brunswick, this 22d day of February, 1907.

JAMES LOCKE STRICKLAND.

Witnesses:

EPHRAIM MURRAY OLIVE,
HELEN PARKER LITTLEBEALE.